(12) United States Patent
Freeman (10) Patent No.: US 11,784,918 B2
(45) Date of Patent: Oct. 10, 2023

(54) SYSTEMS AND METHODS FOR BACKUP COMMUNICATIONS

(71) Applicant: Baker Hughes, a GE company, LLC, Houston, TX (US)

(72) Inventor: James Joseph Freeman, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 346 days.

(21) Appl. No.: 16/130,790

(22) Filed: Sep. 13, 2018

(65) Prior Publication Data

US 2020/0092199 A1 Mar. 19, 2020

(51) Int. Cl.
| | | |
|---|---|---|
| *E21B 47/14* | (2006.01) | |
| *H04B 3/58* | (2006.01) | |
| *H04B 3/54* | (2006.01) | |
| *H04B 11/00* | (2006.01) | |
| *H04L 45/28* | (2022.01) | |
| *H04L 45/00* | (2022.01) | |
| *H04L 43/0817* | (2022.01) | |
| *E21B 47/13* | (2012.01) | |
| *E21B 47/12* | (2012.01) | |

(52) U.S. Cl.
CPC ............. *H04L 45/28* (2013.01); *E21B 47/12* (2013.01); *E21B 47/13* (2020.05); *E21B 47/14* (2013.01); *H04B 11/00* (2013.01); *H04L 43/0817* (2013.01); *H04L 45/22* (2013.01)

(58) Field of Classification Search
CPC ..... H04L 45/28; H04L 43/0817; H04L 45/22; E21B 47/122; E21B 47/14; H04B 11/00
See application file for complete search history.

(56) References Cited

U.S. PATENT DOCUMENTS

| | | |
|---|---|---|
| 6,816,082 B1 | 11/2004 | Laborde |
| 2004/0262008 A1 | 12/2004 | Deans |
| 2012/0286967 A1 | 11/2012 | Alteirac |
| 2013/0106615 A1 | 5/2013 | Prammer |
| 2015/0292321 A1 | 10/2015 | Keller |
| 2019/0292902 A1* | 9/2019 | Jarvis ................... G01K 1/026 |

OTHER PUBLICATIONS

International Search Report and Written Opinion for Int'l Application No. PCT/US2019/044369, dated Nov. 26, 2019, 10 pgs.

* cited by examiner

*Primary Examiner* — Melvin C Marcelo
(74) *Attorney, Agent, or Firm* — Sprinkle IP Law Group (57) ABSTRACT

Systems and methods for enabling communication in a downhole power and communications system installed in a well, where one or more components of a wired backbone of the system have failed. Equipment positioned at the surface of a well is connected to a wired power and communication backbone that has one or more conductors and one or more nodes with standardized interfaces that enable downhole devices to be interchangeably connected to the wired backbone. When the wired backbone has failed at one or more points, preventing wired communications between the surface equipment and one or more downhole devices installed at the nodes, one or more wireless-enabled modules are installed at corresponding nodes of the wired backbone to establish wireless channels that bridge the failed portion of the wired backbone and thereby enable communication between the surface equipment and the downhole devices.

8 Claims, 6 Drawing Sheets

SYSTEMS AND METHODS FOR BACKUP COMMUNICATIONS

BACKGROUND

Field of the Invention

The invention relates generally to the production of fluids such as oil from wells, and more particularly to systems and methods for enabling communications with devices that are located downhole in the well following the failure of a wired communications backbone that is installed in the well.

Related Art

Petroleum drilling and production operations typically involve the collection and processing of large amounts of data and the adjustment of production equipment based on the processed data. Various different tools may be installed in wells to collect the necessary information and to control well operations. For instance, sensors may be installed downhole to sense well conditions such as temperature, pressure, flow rate, etc. Additionally, control devices such as valves and packers may be installed downhole to regulate the production of oil from the wells.

In some cases, a power and communications system may be deployed in the well to provide power to the downhole tools, as well as to enable communications between the downhole tools and control equipment at the surface of the well. The power and communications system may, for instance, consist of a wired backbone that has nodes positioned at various intervals along the length of the backbone. The nodes are each configured to allow a variety of devices to be removably coupled to the backbone through the nodes. The nodes may, for example, have several slots with standard interfaces that allow the devices to be connected to the backbone. Devices that are connected to the nodes can receive power through the backbone from a power supply positioned at the surface of the well, and the devices may communicate with equipment at the surface of the well (or with each other) through the backbone.

Occasionally, components of this system will fail. If one of the downhole devices connected to the backbone fails, the device can be disconnected from the corresponding node, retrieved, and replaced with another device. It is much more problematic, however, if the backbone itself fails because, while individual devices that are connected to the nodes can be removed and replaced relatively easily, it would be very difficult and very costly to remove and/or replace the wired backbone of the system. It would therefore be desirable to provide means to overcome the problem of a failure of the wired backbone.

SUMMARY

This disclosure is directed to systems and methods for enabling communication in a downhole power and communications system installed in a well, where one or more components of a wired backbone of the system have failed. In particular, the systems and methods use modules incorporating wireless communication subsystems, where the modules are installed in nodes of the wired backbone. The wireless communication subsystems of the installed modules are adapted to bridge the failed portions of the wired backbone to allow communication between equipment at the surface of the well and devices that are coupled to the wired backbone and thereby solve the problem posed by a failure of the wired backbone.

One embodiment is a system that includes surface equipment positioned at the surface of a well a prewired power and communication backbone, and one or more wireless-enabled modules. The wired power and communication backbone is installed in a well bore and is coupled to the surface equipment. The wired backbone has one or more conductors and one or more nodes coupled to the conductors, where the nodes are positioned at different locations along the length of the backbone. Each of the nodes has one or more interfaces that enable connection of downhole devices to the wired backbone. The interfaces may be standardized to enable downhole devices to be interchangeably connected to different ones of the interfaces. The downhole devices are adapted to communicate with the surface equipment via the wired backbone. The nodes are adapted to enable the devices to be connected, disconnected or replaced downhole after the backbone has been installed in the well bore, without having to remove the backbone from the well bore. The prewired backbone has failed at one or more points, preventing wired communications between the surface equipment and one or more downhole devices installed at one or more of the nodes. One or more wireless-enabled modules are installed at corresponding nodes of the wired backbone. The wireless-enabled modules are adapted to establish one or more wireless channels that bridge the failed portion of the prewired backbone, and to communicate with the surface equipment via the wireless channels.

The wireless-enabled modules may be adapted to communicate via any suitable wireless means, such as through an acoustic transceiver or a wireless electromagnetic transceiver. The wireless-enabled modules may be configured solely to provide the capability to wirelessly bridge the failed portion of the wired backbone, or they may also provide other functionality, such as the capability to sense conditions in the well or to control well operations. The wireless channel may be enabled by a single wireless-enabled module, or it may be enabled by multiple modules, where a first one of the modules generates a wireless signal and a second wireless-enabled module repeats the wireless signal. In some cases, the communication channel between a first one of the nodes and the surface equipment may include both a first, wired segment formed by a portion of the prewired backbone and a second, wireless segment formed by the wireless channel established by the wireless-enabled module.

An alternative embodiment comprises a method implemented in a system that has a wired backbone for communication of data between surface equipment and one or more downhole devices, where the wired backbone includes one or more nodes having interfaces for installation of the downhole devices. This method includes detecting a failure of the wired backbone, where the failure prevents wired communication of data between the surface equipment and at least one of the downhole devices connected to the wired backbone. A wireless-enabled module is installed at one of the nodes of the wired backbone, and a wireless communication channel is established between the surface equipment and the wireless-enabled module, bypassing the failed portion of the wired backbone. Data is then transmitted data between the surface equipment and the wireless-enabled module via a data path that includes the wireless communication channel. The wireless channel may be acoustic, electromagnetic, or another type of wireless channel, and it may form all or a part of the communication path between the surface equipment and the downhole modules and devices. The wireless channel may be formed by one wireless-enabled module, or multiple modules (with one or more acting as repeaters). The wireless-enabled module may provide functions other than wireless communication, such as sensing or control functions.

Numerous other embodiments are also possible.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

As described herein, various embodiments of the invention comprise systems and methods that are implemented in relation to a failed power and communications system that is installed in a well. More particularly, the power and communications system has a prewired backbone with one or more nodes that allow downhole devices such as sensors or control modules to be connected to the backbone. The downhole devices normally receive power through the backbone and communicate with surface equipment and possibly each other through the backbone. If the prewired backbone fails, the downhole devices would normally be unable to receive power and/or communicate through the backbone. Consequently, in the present systems and methods, modules having wireless communication subsystems are installed at one or more of the nodes, thereby enabling wireless communications that bypass the failed portion of the backbone. It should be noted that "failure" is used herein to refer to any defect, malfunction or other problem that prevents communication over one or more portions of the wired backbone.

Figure 1:
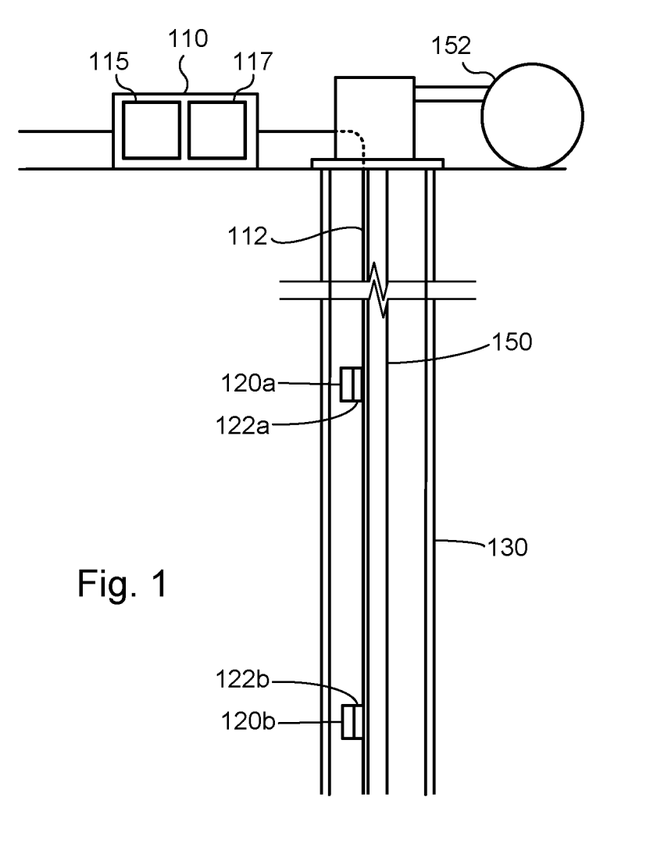
FIG. 1 is a diagram illustrating a power and communications system installed in a well in accordance with one exemplary embodiment.

Referring to FIG. 1, a diagram illustrating a power and communications system installed in a well in accordance with one exemplary embodiment is shown. As depicted in this figure, a well is drilled in a geological formation, and a casing 130 is installed in the well. Production tubing 150 is deployed in the well. Production tubing 150 is deployed into the well from a deployment device such as, for example, spool 152.

Although the embodiments described herein are implemented with respect to well operations that employ production tubing, alternative embodiments may be implemented in connection with any string or string component that is used in well operations, such as drill pipe, pipe segments, coiled tubing, wired pipe, wireline tools, logging-while-drilling (LWD) tools and measurement-while-drilling (MWD) tools. The components of the string may include various downhole components or assemblies, such as drilling assemblies, measurement tools, communication assemblies, packers, perforation devices, stimulation devices, and the like. Similarly, the well operations may employ a surface assembly that includes suitable devices for performing or facilitating operations, such as a derrick, a platform, drilling equipment, artificial lift devices, fluid injection, and the like.

Performance of the well operations may be facilitated by sensors and various other downhole devices. A power and communications system is deployed into the well in order to provide power to the downhole devices and to enable communications with the downhole devices. This power and communications system has a prewired backbone that includes a cable 112 that is connected to one or more nodes 122. The cable is connected to equipment 110 at the surface of the well. One or more modules 120 are coupled to cable 112 through nodes 122. Modules 120 may incorporate any of a variety of devices that are commonly used downhole, such as sensors or control devices.

Surface equipment 110 may be configured to receive power from an external source and to provide power to the modules 120. Surface equipment 110 may also include control systems 115, monitoring systems 117, or the like which are in communication with modules 120. For instance, the surface equipment may receive data generated by sensors in the downhole modules, or the surface equipment may generate control data which is provided to control devices that are incorporated into the downhole modules.

Surface equipment 110 may include a processor (a CPU or other processing unit), memory (RAM and/or ROM), data storage (e.g., hard drive, flash drive, etc.), I/O devices, transmitters, receivers, and the like, as needed for receiving, processing and storing information received from the downhole devices, as well as generating and communicating control data for operation of the downhole devices. The downhole devices may likewise include various components, including sensors, tools, processors, memories, transmitters, receivers, etc., as may be needed for the functioning of the devices.

The cable 112 of the prewired backbone may be connected to the surface equipment and the downhole devices using any suitable medium. "Cable", as used herein may include conventional cables or tubing encapsulated conductors (TECs) which include one or more electrical conductors that are surrounded by protective tubing. Cables or TECs may include separate conductors for power and one or more communication channels, or common conductors may be employed to implement common communication channels, or to carry both power and communications. Cables and TECs may also employ non-electrical conductors, such as optical fibers to communicate data between the surface equipment and downhole devices. Thus, "conductor" should be construed to refer to any type and number of electrical conductors, optical fibers or other mechanisms for transmitting communicating, data (e.g., sensor signals, control signals or other data). The deployed cable and/or downhole devices may be positioned in or on the wall of the production tubing or other string, in or on the casing or the wall of the well bore, or in the annular space between the string and the casing or well bore wall.

The nodes 122 of the wired backbone are coupled to cable 112 at various positions along the length of the cable. The nodes may be positioned at regular intervals along the length of the cable, or the distances between successive nodes may vary. The nodes may be tapped into a continuous length of cable, or they may be spliced, welded or otherwise connected between successive segments of cable to form an initially continuous conductive path (e.g., electrical or optical).

The nodes provide interfaces to allow downhole devices or modules to be removably connected to the nodes. The interfaces may be standardized so that devices can be interchangeably coupled to different slots or different nodes. The downhole devices can therefore be installed at the nodes or removed from the nodes while the wired backbone is deployed within the well. When the downhole devices are installed at the nodes, the devices are coupled to the conductors of the cable, so that power can be supplied to the devices through the cable, and/or so that the devices can communicate through the cable to the surface equipment. The interfaces of the nodes may enable the downhole devices to directly connect with the conductors (e.g., through connections to electrical terminals), or they may be configured to enable the devices to be coupled wirelessly to the cable. The nodes may also enable the downhole devices that are connected to each node to communicate with each other via the node (e.g., through interconnections between the node's device interfaces).

Figure 2:
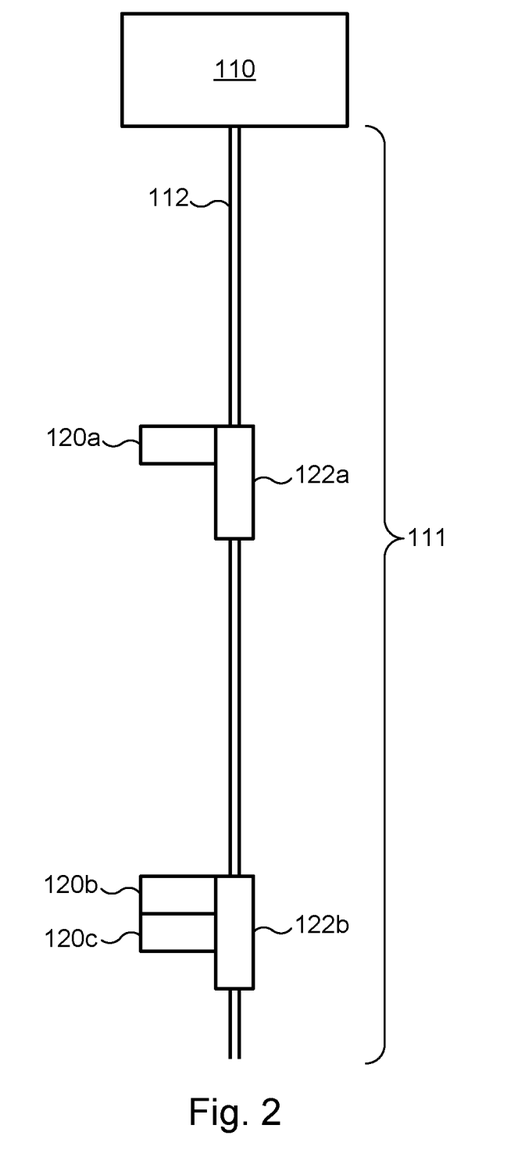
FIG. 2 is a functional block diagram illustrating an exemplary structure of a deployed power and communications system in accordance with one embodiment.

Referring to FIG. 2, a functional block diagram illustrating an exemplary structure of a deployed power and communications system in accordance with one embodiment is shown. As depicted in this figure, the system includes surface equipment 110, which is connected to a wired backbone 111. Wired backbone 111 includes cable 112 and nodes 122. Each of nodes 122 may have one or more downhole devices 120 installed thereon. While only two nodes are shown in the figure, the backbone may include any number of nodes located at different positions along the length of the cable. Each of the nodes may have one or more downhole devices that are installed at the nodes' device interfaces. Some nodes may have no devices installed thereon.

Figure 3:
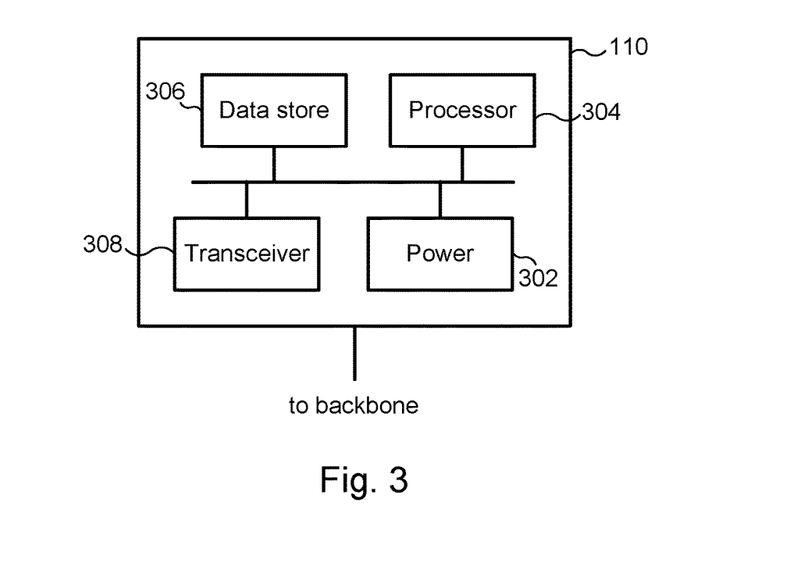
FIG. 3 is a functional block diagram illustrating an exemplary structure of the surface equipment in one embodiment.

Referring to FIG. 3, a functional block diagram illustrating an exemplary structure of the surface equipment in one embodiment is shown. As depicted in this figure, surface equipment 110 may include a number of components and subsystems such as, including a power subsystem 302, processing subsystem 304, data store 306, and transceiver 308. Numerous other components may also be used in various alternative embodiments. These components may be interconnected by any suitable means, such as an internal bus or network, electrical or optical interconnects, etc. The components may be contained within a common housing, or they may be distributed systems that are interconnected by one or more networks or other interconnects. In one embodiment, power subsystem 302 may receive power from an external source and condition the power (e.g., rectify, convert, prevent power spikes, etc.) for use by the components and subsystems of the surface equipment. Power subsystem 302 may also condition power to be provided to the downhole devices via the wired backbone. Processing subsystem 304 may perform various types of data processing, I/O, control functions, etc. for the surface equipment, and may access data store 306 to store or retrieve data as necessary to perform these functions. Processing system 304 may similarly process data received from the downhole devices coupled to the backbone and generate control information to be provided to these downhole devices. Data may be received from the downhole devices or transmitted to the downhole devices via transceiver 308.

Figure 4:
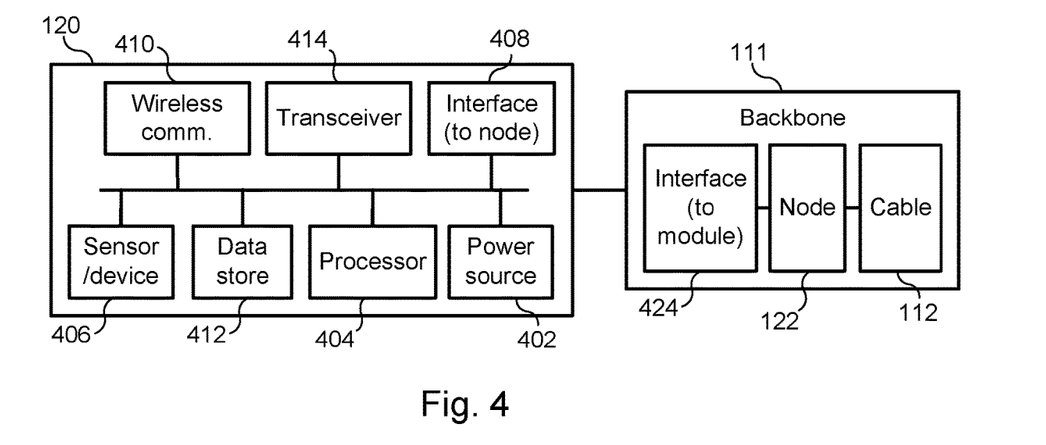
FIG. 4 is a functional block diagram illustrating an exemplary structure of a downhole device in accordance with one embodiment.

Referring to FIG. 4, a functional block diagram illustrating an exemplary structure of a downhole device in accordance with one embodiment is shown. Device 120 may include a variety of components, such as a power source 402, a processor 404, a sensor (or control device) 406, a node interface 408, a wireless communication subsystem 410, a data store 412, and a transceiver 414. Again, these components may be interconnected by any suitable means. Power source 402 may be a battery, and energy harvesting device, or any other means that can be used to provide power to the components and subsystems of the downhole device. Sensor 406 may monitor well conditions and provide data that is transmitted to the surface equipment or other downhole devices, or is used within the downhole device itself. Control devices may perform corresponding control functions (e.g. controlling downhole valves, etc.) responsive to control information received from the surface equipment, or based on locally generated information. Processor 404 may perform control functions necessary for the operation of the downhole device. For example, processor 404 may manage collection and storage of sensor data from sensor 406, communicate sensor data or control information to the wired backbone or other devices via node interface 408 or communicate wirelessly to surface equipment or other devices via wireless communication subsystem 410.

Downhole device 120 normally communicates with the surface equipment via wired backbone 111. For example, data generated by sensor 406 may be transmitted by transceiver 414 through interface 408 of the downhole device and interface 424 of node 122 to cable 112 of the wired backbone, which then carries the signal to the surface equipment. Cable 112 may also carry the signal to other downhole devices via other nodes in the backbone. Similarly, control information or other data may be generated by the surface equipment and transmitted through cable 112 to the nodes 122. From there, the data can be conveyed through node interface 424 and downhole device interface 408 to the downhole device, which can make use of the data as needed for the operation of the device.

Thus, the system is designed with the intent to transmit data through the wired backbone. Likewise, the system is designed with the intent to provide power from the surface equipment to the downhole devices via the wired backbone. (The downhole devices that are initially installed on the nodes may therefore be designed to receive power from the wired backbone, rather than having internal power sources.) If one of the downhole devices installed on the wired backbone fails, the device can be retrieved and replaced with a properly functioning device. This replacement can be accomplished without having to retrieve the wired backbone, so it is not cost-prohibitive. If, however, the backbone itself fails, the failure of the backbone may prevent communication with one or more of the downhole devices installed on the backbone's nodes, and may prevent power from being provided to one or more of these devices. Conventionally, this failure would render at least a portion of the backbone (and corresponding downhole devices) unusable, unless the backbone itself were retrieved, repaired and redeployed, which entails great expense.

The present systems and methods therefore provide mechanisms to bypass the point of failure of the wired backbone and therefore allow continued use of all or part of the system. This is accomplished by installing downhole devices which incorporate alternative communication channels and or self-contained energy sources which allow these devices to operate and communicate with the surface equipment and/or other downhole devices despite the backbone failure. These alternative-communication modules (which may be referred to herein as wireless-enabled devices or modules) may serve as replacement downhole devices that incorporate functional components (e.g., sensors or control devices) which provide the same functions as the initially installed downhole devices that communicated and received power through the wired backbone. The alternative-communication modules may alternatively serve to provide a wireless communication channel to bypass the failed portion of the backbone without also providing the operational functions that are provided by the conventional downhole devices (e.g., sensing or control functions).

Referring again to FIG. 4, the illustrated downhole device 120 is configured as an alternative-communication module, and therefore includes a wireless communication subsystem 410 which is configured to communicate with the surface equipment and/or other downhole devices. Wireless communication subsystem 410 may include an antenna, a transducer, or other means to propagate wireless signals. Even if the wireless communication subsystem of the device is being used, the device may also communicate and/or receive power through the portion of the wired backbone to which the device is connected, as will be discussed in more detail below.

Figure 5A:
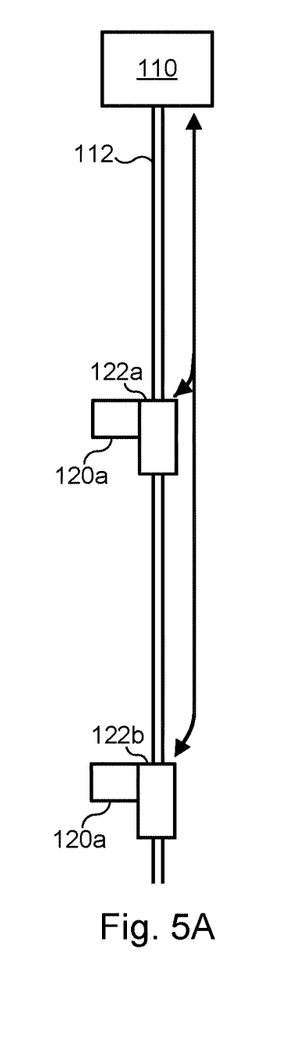
FIGS. 5A-5D are a set of diagrams illustrating the operation of a power and communications system in accordance with one embodiment.
Figure 5B:
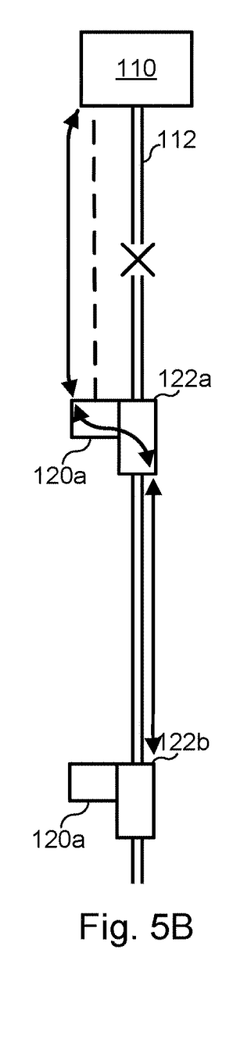
Figure 5C:
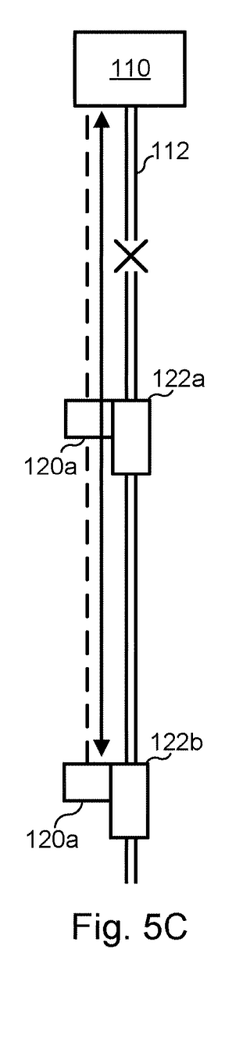
Figure 5D:
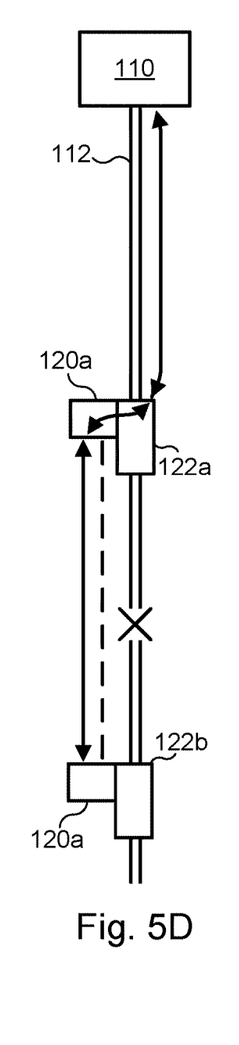

Referring to FIGS. 5A-5D, a set of diagrams illustrating the operation of a power and communications system in accordance with one embodiment is shown. FIG. 5A depicts a scenario in which a wired backbone connecting surface equipment to a set of downhole devices is used to carry power and/or communications between the surface equipment and the downhole devices prior to a failure of the backbone. FIGS. 5B-5D depict scenarios in which the wired backbone has failed, and alternative-communication modules are used to bridge failed portions of the backbone and thereby enable transmission of at least communications between the surface equipment and downhole devices. ("Bridge" is used herein to refer to the establishment of an alternative communication pathway or channel that parallels the failed portion of the wired backbone to re-establish communications between devices or components that communicated via the wired backbone prior to failure of the backbone.)

Referring to FIG. 5A, surface equipment 110 is coupled to a wired backbone which includes cable 112 and nodes 122. Surface equipment 110 provides power via the backbone to downhole devices that may be coupled to nodes 122. The wired backbone also enables communications between surface equipment 110 and downhole devices coupled to nodes 122. It should be noted that conventional downhole devices which receive power and communications only through the wired backbone are not explicitly shown in the figure for purposes of clarity.

FIG. 5B depicts a scenario in which the wired backbone has failed between surface equipment 110 and node 122a. The point of failure is denoted by the "X" in the upper part of the figure. As a result of the failure, the wired backbone cannot support the transmission of power or communications across the point of failure. Thus, surface equipment 110 cannot provide power to downhole devices installed at nodes 122a or 122b, and cannot communicate with these devices via the wired backbone. When the failure of the wired backbone is detected, a downhole device 120 which has wireless communication capabilities is installed at node 122a. If node 122a has an open slot (an available device interface), device 120 may be installed without having to remove any other downhole devices. If there are no available slots at node 122a, a device that was previously installed at this node may be removed and replaced with a device that has both wireless communication capabilities and the same (or similar) functional components as the removed device.

After the wireless-enabled device 120 is installed at node 122a, the system may use the wireless communication channel provided by the device to bridge the failed portion of the wired backbone. The wireless channel established between wireless-enabled device 120 and surface equipment 110 is depicted by the dashed line in the figure. In one embodiment, wireless-enabled device 120 may communicate only via the wireless channel (e.g., only between surface equipment 110 and device 120). In an alternative embodiment, device 120 may enable the crossover of communications between the wireless channel and a wired communications channel in the backbone (i.e., a portion of the backbone that has not failed). The arrows in the figure indicate the flow of communications in the latter embodiment, where data can be communicated wirelessly between surface equipment 110 and device 120, and can then be transmitted over the wired backbone between device 120 (at node 122a) and devices installed at node 122b.

FIG. 5C depicts a scenario in which the wired backbone has again failed between surface equipment 110 and node 122a, as denoted by the "X" in the figure. In this scenario, two wireless-enabled devices (120a and 120b) are installed in available slots of corresponding nodes (122a and 122b) of the wired backbone. As shown in this figure, wireless-enabled device 120a establishes a wireless communication channel (shown as a dashed line) to surface equipment 110 which bridges the point of failure in the wired backbone. A wireless communication channel (shown as a dashed line) is also established between device 120*a* and device 120*b*. Thus, device 120*a* can transmit data to, or receive data from, both surface equipment 110 and downhole device 120*b*. Further, device 120*a* functions as a repeater for communications between device 120*b* and surface equipment 110. The flow of data between the surface equipment 110 and downhole devices 120 is shown by the arrows in the figure.

FIG. 5D depicts a scenario in which the wired backbone has failed between node 122*a* and node 122*b*, as indicated by the "X" in the lower portion of the figure. In this scenario, two wireless-enabled devices (120*a* and 120*b*) are again installed in open slots of corresponding nodes (122*a* and 122*b*) of the wired backbone. In this case, a wireless communication channel (indicated by the dashed line) is established between device 120*a* and device 120*b*. As indicated by the arrows in the figure, downhole device 120*b* can transmit data to, or receive data from, device 120*a* via the wireless channel. Device 120*b* can transmit data to, or receive data from, surface equipment 110 by communicating wirelessly with device 120*a*, which can in turn communicate with surface equipment 110 via the upper portion of the wired backbone (which has not failed). It should be noted that downhole device 120*a* may be able to establish a wireless communication channel to surface equipment 110, but it is anticipated that the existing wired channel (via the backbone cable) may provide a more efficient and reliable means of communicating data between these devices. It should also be noted that, because node 122*a* still has a wired connection to surface equipment 110, this node (and downhole device 120*a*) may still be able to receive power from the surface equipment, and consequently may not require an internal power source. Device 120*b*, on the other hand, cannot receive power via the wired backbone, so it needs its own power source, such as a battery or energy harvesting device.

It should be noted that when communication is established between surface equipment 110 and one of devices 120, communication may also be thereby established between the surface equipment and any devices coupled to the backbone below the device (assuming that the backbone has not failed below the device with which communication has been established).

Figure 6:
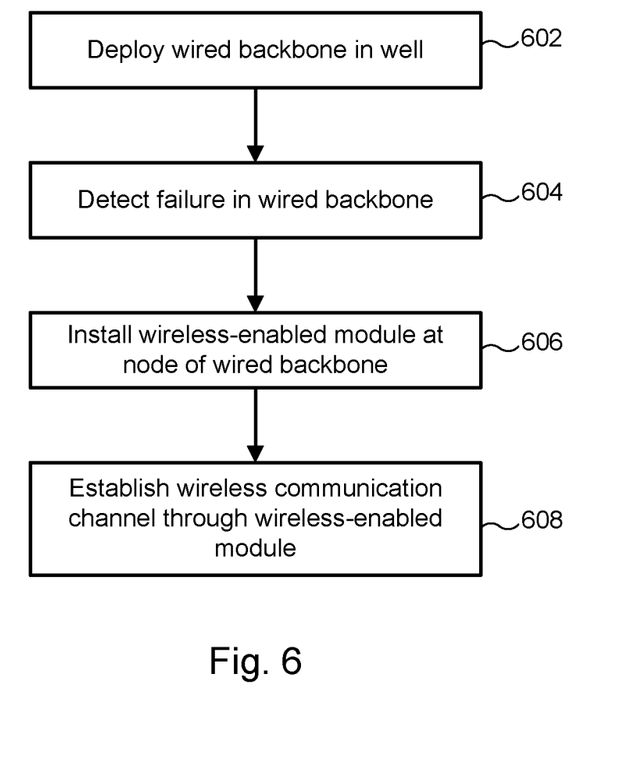
FIG. 6 is a flow diagram illustrating a method for establishing communications with downhole devices connected to a wired backbone deployed in a well in accordance with one embodiment.

Referring to FIG. 6, a flow diagram is shown to illustrate a method for establishing communications with downhole devices connected to a wired backbone deployed in a well in accordance with one embodiment. As depicted in the figure, the method includes deploying a wired backbone in a well (602). The backbone is part of a power and communications system in which one or more downhole devices that are connected to nodes of the wired backbone can initially receive power and communications via the backbone from equipment located at the surface of the well. At some point after the backbone has been deployed in the well, there may be a failure of the backbone which prevents power and or communications from being carried over the backbone between the surface equipment and the downhole devices. After such a failure of the backbone is detected (604), a wireless-enabled downhole device is installed one of the nodes of the backbone (606). The wireless-enabled downhole device may replace a previously installed to device (and provide the functionality of the previously installed device), or it may be installed in an already-open slot of the node. The wireless-enabled device then establishes a wireless communication channel that bridges the failed portion of the wired backbone (608). Data can then be communicated over the wireless channel. The wireless communication channel may be the sole data path used to communicate data, or it may be used in conjunction with a wired channel (i.e., the data path may include both the wireless channel and a portion of the wired backbone).

Figure 7:
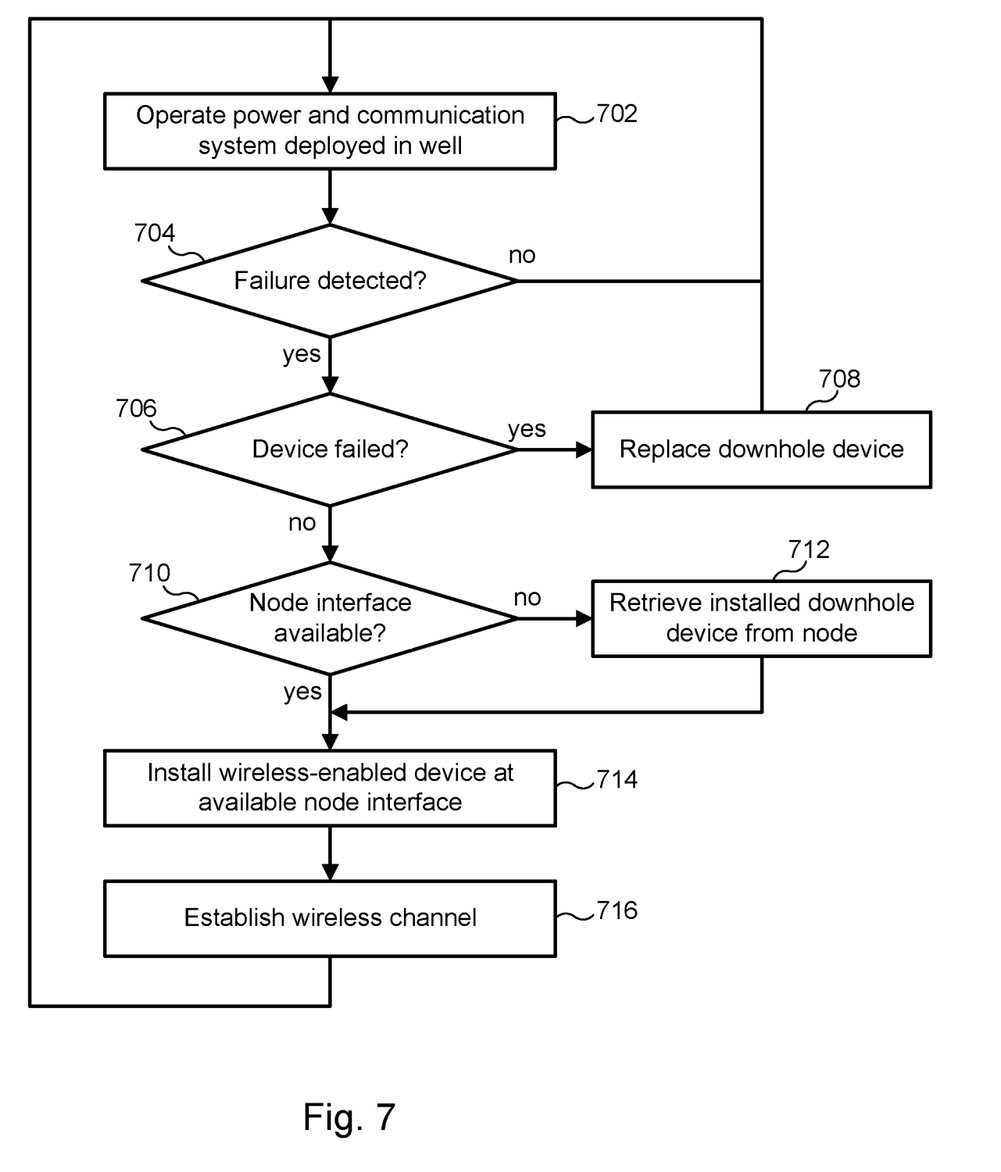
FIG. 7 is a flow diagram illustrating method for establishing communications with downhole devices connected to a wired backbone deployed in a well in accordance with an alternative embodiment.

Referring to FIG. 7, flow diagram illustrating an alternative method for establishing communications with downhole devices connected to a wired backbone deployed in a well is shown. The method is again implemented in a power and communications system having one or more downhole devices that are connected to nodes of the wired backbone. In this embodiment, the downhole devices are initially operated using power and communications that are received via the backbone from equipment located at the surface of the well (702). If no failure is detected (704), the downhole devices continue to operate in this manner. If a failure is detected (704), it is determined whether the failure is the result of a failed downhole device (706). If it is a device failure, the device is retrieved and replaced with a working device (708). If the failure is not due to a failed device, the failure is in the backbone, so it is necessary to install a wireless-enabled downhole device to bridge the failure in the backbone. It is therefore determined whether there is an available interface in an appropriate one of the nodes of the backbone (710) as explained above (see FIGS. 5A-5D). If there is not an available interface, one of the downhole devices that is currently installed at the node where the wireless-enabled downhole device should be installed is retrieved (712) in order to make an interface available. When an interface is available, the wireless-enabled downhole device is installed at this interface (714). A wireless communication channel is then established using the installed wireless-enabled device to bridge the failed portion of the backbone (716), and the operation of the system resumes (702). While the wireless channel may enable communications, it should be noted that that the downhole devices that are no longer connected to the surface equipment by the wired backbone may not be able to continue operation without receiving power from the surface equipment.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by using software programming or code in one or more digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Any particular step, operation, method, routine, operation or portion thereof can execute on a single device or multiple devices. Data may be stored in a single storage medium or distributed through multiple storage media, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method comprising:
installing in a well bore a wired backbone that enables wired communication of data between surface equipment and one or more downhole devices, the installed wired backbone including one or more nodes, each node having one or more interfaces, wherein the downhole devices are physically installed at one or more of the interfaces;
subsequent to installing the wired backbone, detecting a failure of the installed wired backbone, wherein the failure prevents wired communication of data between the surface equipment and the one or more downhole devices connected to the installed wired backbone;
subsequent to detecting the failure of the installed wired backbone and while the wired backbone is installed in the well bore, physically installing a wireless-enabled module at one of the nodes of the installed wired backbone;

establishing a wireless communication channel between the surface equipment and at least the wireless-enabled module, wherein the wireless communication channel bypasses a failed portion of the installed wired backbone; and transmitting data between the surface equipment and the wireless-enabled module via the wireless communication channel.

2. The method of claim 1, wherein the wireless communication channel comprises an acoustic channel and wherein transmitting data between the surface equipment and the wireless-enabled module comprises acoustically transmitting data between the surface equipment and the wireless-enabled module.

3. The method of claim 1, wherein the wireless communication channel comprises an electromagnetic channel and wherein transmitting data between the surface equipment and the wireless-enabled module comprises electromagnetically transmitting data between the surface equipment and the wireless-enabled module.

4. The method of claim 1, further comprising at least one of the wireless-enabled modules sensing one or more downhole conditions and transmitting data corresponding to the sensed downhole conditions to the surface equipment.

5. The method of claim 1, wherein transmitting data between the surface equipment and the wireless-enabled module comprises a first one of the wireless transceivers generating a wireless signal, and a second one of the wireless transceivers repeating the wireless signal.

6. The method of claim 1, wherein transmitting data between the surface equipment and the wireless-enabled module comprises transmitting data via a data path that includes a first, wired segment formed by a portion of the prewired backbone and a second, wireless segment formed by the wireless communication channel.

7. The method of claim 1, further comprising removing a non-wireless-enabled module from a first interface of one of the nodes of the wired backbone and installing the wireless-enabled module at the first interface.

8. The method of claim 1:

wherein installing in the wired backbone in the well bore includes installing a downhole tool which is physically connected the wired backbone;

the method further comprising, subsequent to detecting the failure of the installed wired backbone and establishing the wireless communication channel that bypasses the failed portion of the installed wired backbone, communicating between the downhole tool and the surface equipment via a crossover communication channel that includes both a portion of the one or more wireless channels that bridges the failed portion of the installed prewired backbone and a non-failed portion of the backbone.

* * * * *